United States Patent
Aiello et al.

(10) Patent No.: US 9,118,250 B2
(45) Date of Patent: Aug. 25, 2015

(54) POWER SUPPLY CIRCUIT FOR REMOTELY TURNING-ON ELECTRICAL APPLIANCES

(71) Applicant: STMicroelectronics S.r.l., Agrate Brianza (MI) (IT)

(72) Inventors: Natale Aiello, Trecastagni (IT); Giuseppe Palmisano, S. Giovanni La Punta (IT); Roberto La Rosa, Catania (IT); Alessandro Finocchiaro, Catania (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 419 days.

(21) Appl. No.: 13/832,687

(22) Filed: Mar. 15, 2013

(65) Prior Publication Data

US 2013/0272037 A1     Oct. 17, 2013

Related U.S. Application Data

(63) Continuation-in-part of application No. 13/256,913, which is a continuation of application No. PCT/EP2010/053480, filed on Mar. 17, 2010, now Pat. No. 8,933,592.

(51) Int. Cl.
   H02M 3/335  (2006.01)
   H02J 9/00   (2006.01)
   H01H 47/00  (2006.01)
   H02M 1/00   (2007.01)
   H02M 1/36   (2007.01)

(52) U.S. Cl.
   CPC ........... H02M 3/33507 (2013.01); H02J 9/005 (2013.01); H02M 1/36 (2013.01); H02M 2001/0032 (2013.01); Y02B 70/16 (2013.01)

(58) Field of Classification Search
   USPC ........................................... 307/125
   See application file for complete search history.

(56) References Cited

U.S. PATENT DOCUMENTS

| | | | |
|---|---|---|---|
| 4,500,923 | A | 2/1985 | Duvall et al. |
| 4,651,214 | A | 3/1987 | Rodriguez-Cavazos |
| 4,751,580 | A | 6/1988 | Fitzgerald et al. |
| 5,014,178 | A | 5/1991 | Balakrishnan |
| 5,581,453 | A | 12/1996 | Ueta et al. |
| 5,812,385 | A | 9/1998 | Leu |
| 2002/0125867 | A1 | 9/2002 | Choo et al. |
| 2006/0198167 | A1 | 9/2006 | Nakamura |
| 2011/0001651 | A1 | 1/2011 | Candelore et al. |
| 2011/0001887 | A1 | 1/2011 | Shintani et al. |

FOREIGN PATENT DOCUMENTS

EP     0632563 A2    1/1995

OTHER PUBLICATIONS

International Search Report and Written Opinion dated Jan. 27, 2011from International Application No. PCT/EP2010/053480.

*Primary Examiner* — Robert Deberadinis
(74) *Attorney, Agent, or Firm* — Allen, Dyer, Doppelt, Milbrath & Gilchrist, P.A.

(57) ABSTRACT

A power supply circuit for an electrical appliance, including a turning-on stage configured for determining a transition from a turned-off state, in which the power supply circuit is off and does not supply electric power, to a turned-on state of the power supply circuit. The turning-on stage includes a transducer of the remote-control type configured for triggering the transition in response to the reception of a wireless signal. In some embodiments, operating power is transmitted from a remote controller to a control circuit of the electronic equipment, such that the electronic equipment can be turned on remotely but draws zero standby power.

25 Claims, 10 Drawing Sheets

POWER SUPPLY CIRCUIT FOR REMOTELY TURNING-ON ELECTRICAL APPLIANCES

CROSS REFERENCE TO RELATED APPLICATIONS

This application is a continuation-in-part patent application of U.S. application Ser. No. 13/256,913, filed Nov. 2, 2011, which is a U.S. National stage patent application based on PCT Application Number PCT/EP2010/053480, filed on Mar. 17, 2010, entitled POWER SUPPLY CIRCUIT FOR REMOTELY TURNING-ON ELECTRICAL APPLIANCES, which application claims the priority benefit of Italian Patent Application Number TO2009A000214, filed on Mar. 20, 2009, entitled POWER SUPPLY CIRCUIT FOR REMOTELY TURNING-ON ELECTRICAL APPLIANCES, which applications are hereby incorporated by reference to the maximum extent allowable by law.

TECHNICAL FIELD

The present invention relates to a power supply circuit for remotely turning-on electrical appliances and more in particular to a switch-mode power supply (SMPS).

BACKGROUND ART

As is known, many electrical or electronic appliances, such as for example television sets, radios, and hi-fi systems, envisage a low-consumption mode of operation, referred to as "stand-by mode". In this mode, the electrical appliance is inactive as regards normal operation (for example, display of images for a television set, sound reproduction for hi-fi equipment, etc.) but can be controlled in switching-on through a remote control. As is generally known, an electrical appliance in stand-by mode is in any case supplied through the electric-supply mains, such as domestic power, or battery and consumes energy. The energy consumption is due to the presence of a microcontroller and a sensor connected to the microcontroller, configured for receiving and processing possible commands issued by remote control and supplied for this purpose. Considerable efforts have been made in the last few years to limit current consumption in stand-by mode of electrical appliances, which, so far, generally have levels of consumption of a few watts. However, it is evident that, if the consumption in stand-by mode of a plurality of electrical appliances generally present in dwellings is considered, non-negligible daily consumption levels may be reached.

FIG. 1 shows by means of a block diagram a portion of an electrical appliance 1 (in what follows the portion being referred to as a whole as electrical appliance 1) comprising a power supply circuit 4 (more in particular, a switch-mode power supply circuit SMPS) designed to guarantee operation in stand-by mode of a microcontroller 5 and of a command sensor 6 connected to the microcontroller 5 of the electrical appliance 1. The electrical appliance 1 comprises a supply port 2, which is connected, for example, to the supply mains or to a battery (not illustrated) and receives at input a supply voltage $V_{AL}$. The supply voltage $V_{AL}$ is hence supplied in input to the power supply circuit 4, which supplies the microcontroller 5 both during the normal operating mode and in stand-by mode. In particular, in stand-by mode the microcontroller 5 should be switched on and be able to process possible commands (for example, the command for switching on the electrical appliance 1) issued via a remote control 7 and detected by the command sensor 6. The electrical appliance 1 moreover comprises a supply switch 8, arranged between the supply port 2 and the power supply circuit 4, configured so as to be operated in conduction or interdiction. The switch 8 may, for example, be a main switch of the electrical appliance 1. If the supply switch 8 is operated in conduction (i.e., it is closed), the power supply circuit 4 and the microcontroller 5 are supplied during the stand-by mode; instead, if the supply switch 8 is operated in interdiction (i.e., it is open), the power supply circuit 4 and the microcontroller 5 are not supplied, and the stand-by mode cannot be activated. In the latter case, the electrical appliance 1 is effectively turned off and cannot be switched on via the remote control 7.

FIG. 2 shows a possible embodiment, of a known type, of the power supply circuit 4. In particular, the power supply circuit 4 is of a flyback type.

If the power supply circuit 4 is supplied by means of an AC supply voltage $V_{AL}$, it is advisable to connect a rectifier 9, for example a diode rectifier bridge and a filter capacitor, cascaded to the supply port 2, in order to generate in use a DC working voltage $V_1$.

The DC working voltage $V_1$ is then supplied in input to a primary winding 12 of a transformer 11. The primary winding 12 comprises a first terminal 12' connected to the rectifier 9 and a second terminal 12". The second terminal 12" is connected in series to a drain terminal D of a switching transistor 15, for example a MOSFET device, which is in turn connected, through its own source terminal S, to a ground reference voltage GND. Furthermore, the second terminal 12" of the primary winding 12 is connected in series to a drain terminal D of a turn-on transistor 16, being, for instance, a MOSFET device. The turn-on transistor 16 is connected, via an own source terminal S, to a turn-on capacitor 18, which is in turn connected to a ground reference voltage GND.

The switching transistor 15 and the turn-on transistor 16 are controlled in conduction and interdiction by a driving circuit 19. The driving circuit 19 is moreover connected, through a supply port thereof, to the turn-on capacitor 18, from which it receives the supply during its turning-on step. The supply port of the driving circuit 19 is moreover connected, via a rectifier diode 22, to an auxiliary winding 21 of the transformer 11, which supplies the driving circuit 19 during use, after the turning-on step. Furthermore, a turn-on resistor 23 may be present, connected between a gate terminal G of the turn-on transistor 16 and the second terminal 12" of the primary winding 12.

Finally, the transformer 11 comprises a secondary winding 24 for generating on an output port of the power supply circuit 4 an output voltage $V_{OUT}$ that supplies the microcontroller 5.

In the operating condition in which the electrical appliance is turned off (the supply switch 8 is open), the turn-on capacitor 18 is discharged and the driving circuit 19 is turned off. Closing of the supply switch 8 does not cause immediate turning-on of the driving circuit 19, but generates a passage of current from the supply port 2 through the primary winding 12 and through the turn-on transistor 16, which in turn charges the turn-on capacitor 18. The turn-on transistor 16 is driven in conduction by means of the turning-on resistor 23, which develops, after closing of the supply switch 8, the biasing necessary for switching on (conduction state) the turn-on transistor 16.

When the voltage on the turn-on capacitor 18 reaches a value $V_C$ sufficient to supply the driving circuit 19, the driving circuit 19 turns on and drives the turn-on transistor 16 in interdiction and the switching transistor 15 in conduction. The driving circuit 19 is hence supplied by the auxiliary winding 21.

The turn-on transistor 16 and the turn-on resistor 23 form a turn-on circuit 29 of an active type, operated in order to pre-charge the turn-on capacitor 18 for turning on the driving circuit 19. Following upon closing of the supply switch 8, the electrical appliance 1 can switch to a normal operating mode or to a stand-by mode, awaiting a command (for instance, via the remote control 7) by a user.

Both during the normal mode of use and in the stand-by mode, the switching transistor 15 is operated by the driving circuit 19, for example via a square-wave modulation (pulse-width modulation—PWM) signal, with a frequency usually higher than 16 kHz, and enables to transfer the supply needed for operation of the microcontroller 5 to the secondary winding 24. Consequently, also in stand-by mode the driving circuit 19 is constantly supplied in order to drive the switching transistor 15 appropriately for supply of the microcontroller 5.

Hence, it is evident that the stand-by mode generates an energy consumption that is constant and significant over time on account of the need for supply of the driving circuit 19 and the microcontroller 5.

A possible solution for eliminating the energy consumption in stand-by mode consists in turning off the electrical appliance 1 via the main supply key 8 (however, not always present) or removing the supply physically from the electric-supply mains. These solutions, however, entail the loss of the convenience and practicality of having a complete control of the electrical appliance via remote control.

SUMMARY OF THE INVENTION

One aim of the present invention is to provide a power supply circuit free from the limitations described.

In some embodiments, a power supply circuit is provided for an electrical appliance. The power supply circuit comprises a turning-on stage configured for determining a transition from a turned-off state, wherein said power supply circuit is off and does not supply electric power, to a turned-on state of said power supply circuit, characterized in that said turning-on stage comprises a transducer, of a remote-controlled type, configured for triggering said transition in response to a reception of a wireless signal.

According to an aspect of the invention, a control circuit is configured to control electronic equipment in response to a remote controller. The control circuit comprises a converter circuit configured to convert electromagnetic energy received from the remote controller to stored energy; a power management circuit configured to provide a regulated supply voltage based on the stored energy; a control logic circuit energized by the regulated supply voltage and configured to detect a match between an ID code received from the remote controller and a local ID code representative of the electronic equipment, and to provide an enable signal in response to detecting the match; and an actuator circuit configured to activate the electronic equipment in response to the enable signal.

According to another aspect of the invention, a method is provided for remotely controlling electronic equipment. The method comprises converting, by a converter circuit, electromagnetic energy received from a remote controller to stored energy; providing, by a power management circuit, a regulated supply voltage based on the stored energy; energizing a control logic circuit with the regulated supply voltage; detecting, by the control logic circuit, a match between an ID code received from the remote controller and a local ID code representative of the electronic equipment, and providing an enable signal in response to detecting the match; and activating the electronic equipment in response to the enable signal.

According to a further aspect of the invention, a control circuit is configured to control electronic equipment in response to a remote controller. The control circuit comprises a converter circuit configured to convert electromagnetic energy received from the remote controller to stored energy; a power management circuit configured to turn on a regulated supply voltage in response to a voltage representative of the stored energy reaching a first threshold value; a control logic circuit energized by the regulated supply voltage and configured to provide an enable signal in response to a condition being met; and an actuator circuit configured to activate the electronic equipment in response to the enable signal.

BRIEF DESCRIPTION OF THE DRAWINGS

For a better understanding of embodiments of the present invention, a preferred embodiment thereof is now described, purely by way of non-limiting example and with reference to the annexed drawings, wherein.

DETAILED DESCRIPTION

Figure 1:
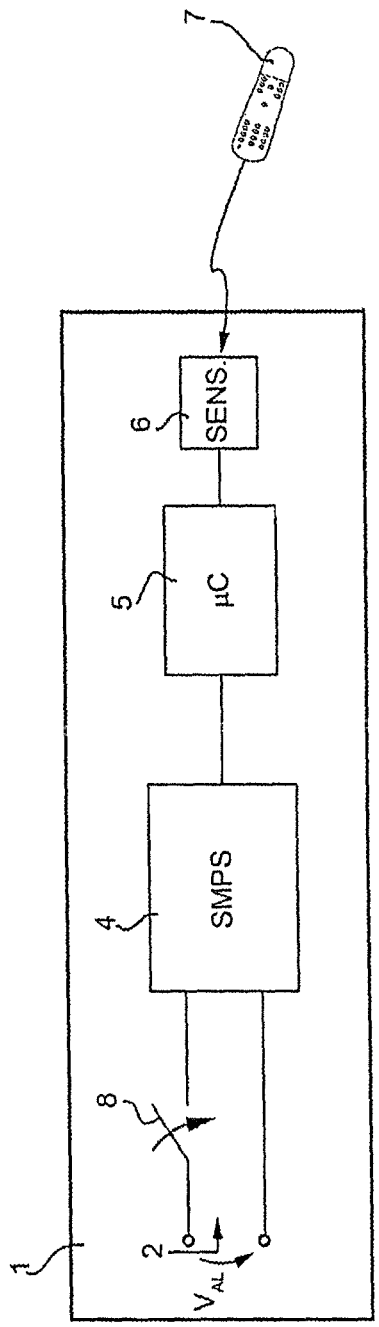
FIG. 1 shows a block diagram of a portion of an electrical appliance comprising a power supply circuit for remotely turning-on the electrical appliance.
Figure 2:
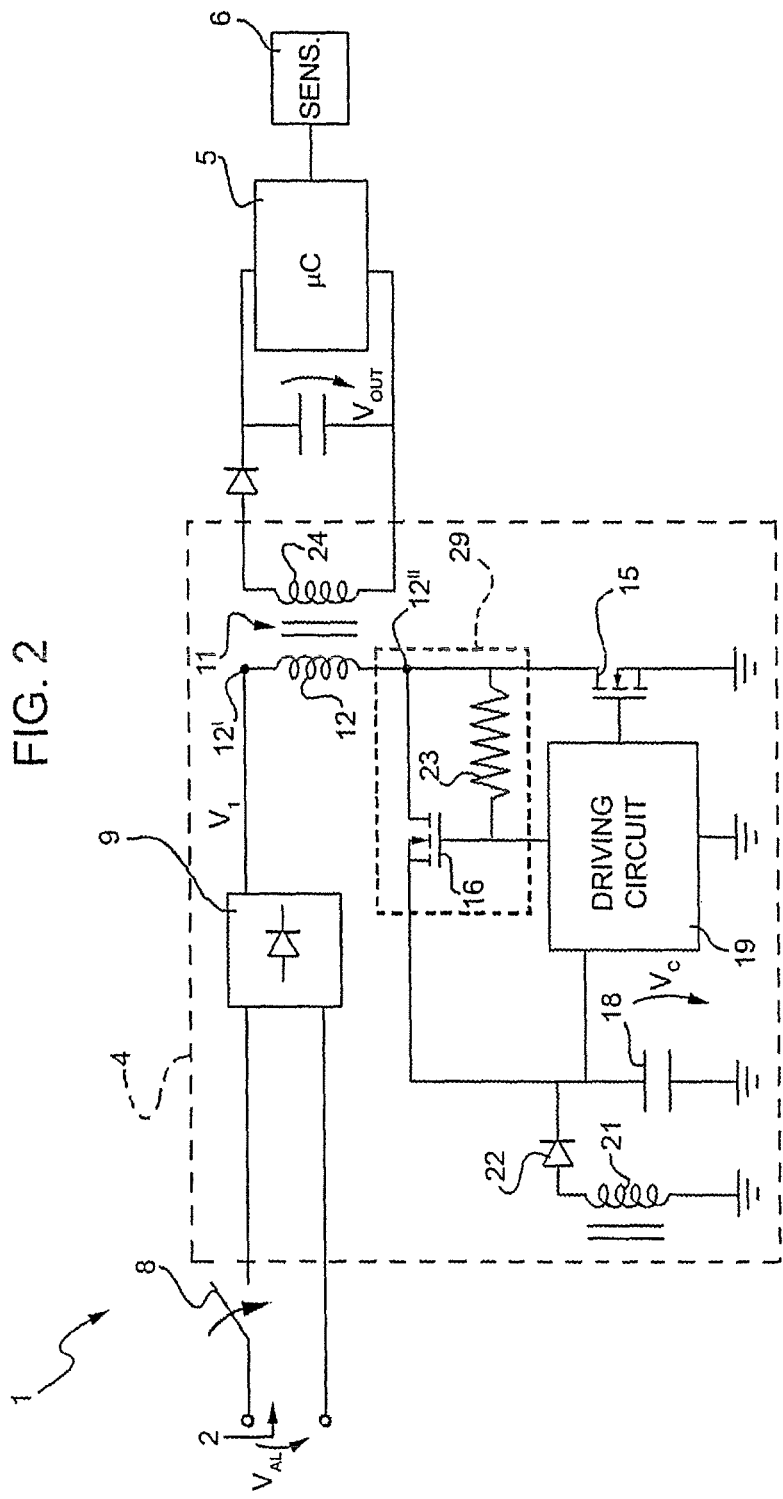
FIG. 2 shows a switch-mode power supply circuit of a known type for managing remote turning-on of an electrical appliance.

For simplicity of description, reference will be made to a power supply circuit of a flyback type, similar to the one illustrated in FIG. 2; however, other types of supply circuits can be implemented, for example, a converter of a boost type, a forward type, a resonant type, or some other type.

Figure 3:
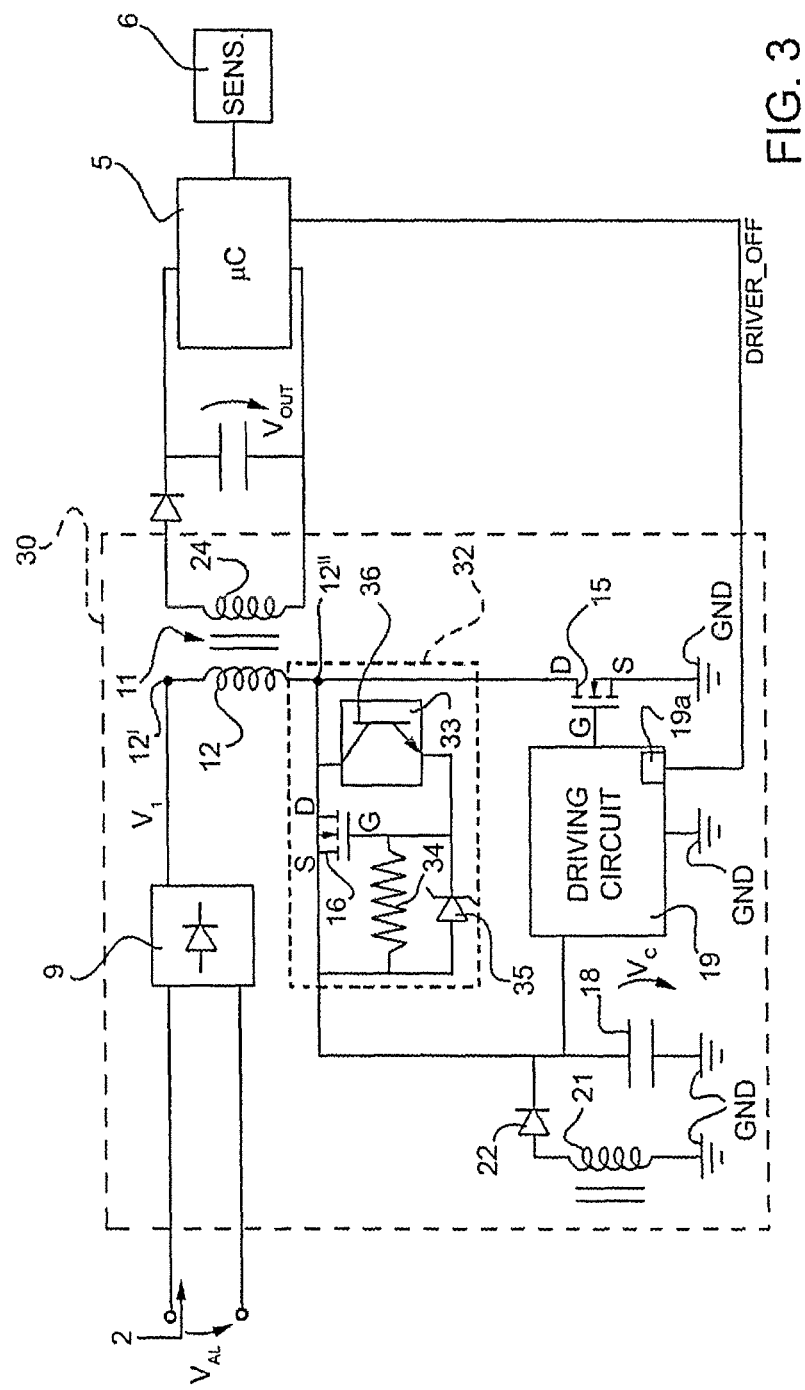
FIG. 3 shows a power supply circuit according to an embodiment of the present circuit, for managing remote turning-on of an electrical appliance.

FIG. 3 shows a power supply circuit 30, in particular a switch-mode power supply (SMPS) circuit of a flyback type. Elements of the power supply circuit 30 of FIG. 3, analogous to and having substantially the same function of the ones described with reference to the power supply circuit 4 of FIG. 2, will not be described any further herein.

The power supply circuit 30 comprises a turn-on circuit 32 that can be activated remotely.

The turn-on circuit 32 comprises a turn-on transistor 16 similar to the one described with reference to FIG. 2. However, in this case the gate terminal G of the turn-on transistor 16 is not directly connected to, and controlled by, the driving circuit 19.

The turn-on circuit 32, which can be connected indifferently to the first terminal 12' or to the second terminal 12", further comprises a transducer 33, which can be remote-controlled and is configured to enable, when activated, passage of a current through it. The transducer 33 is connected between the drain terminal D of the turn-on transistor 16 and the gate terminal G of the turn-on transistor 16.

The transducer 33 can be a photodiode, a photomultiplier or a phototransistor, configured so as to enable passage of a current across its terminals if activated by a light beam at a particular wavelength or within a range of wavelengths. Furthermore, the transducer 33 can be formed by a plurality of photodiodes or photomultipliers or phototransistors connected in series one another.

Finally, the turn-on circuit 32 comprises a turn-off resistor 34, preferably having a resistance comprised between 100 kΩ and 2 MΩ, connected between the gate terminal G of the turn-on transistor 16 and the source terminal S of the turn-on transistor 16; and a Zener diode 35, connected between the gate terminal G of the turn-on transistor 16 and the source terminal S of the turn-on transistor 16, in parallel to the turn-off resistor 34, and having a Zener voltage $V_{ZENER}$ preferably of 30 V.

For simplicity of description; in what follows reference will be made to a transducer 33 of an optical/electrical type, more precisely a phototransistor 36. The phototransistor 36 is activated by means of an incident light beam, preferably not visible by the human eye and having, for example, a wavelength in the infrared (greater than 700 nm) or in the ultraviolet (less than 400 nm). The light beam may be generated by a user through a remote control (shown in) configured for generating such a light beam.

In use, when the phototransistor 36 is driven in conduction (by means of an incident light beam having, for example, a wavelength in the infrared), a current flows through it and a voltage develops across its terminals, biasing the gate terminal G of the turn-on transistor 16. If the biasing voltage generated is higher than the conduction threshold of the turn-on transistor 16, the turn-on transistor 16 turns on, connecting the supply port 2 with the turn-on capacitor 18, through the rectifier 9 and the primary winding 12 of the transformer 11. In this way, the turn-on capacitor 18 is charged and, when the voltage on the turn-on capacitor 18 reaches a value $V_C$ sufficient to supply the driving circuit 19, the driving circuit 19 turns on and drives in conduction the switching transistor 15. Hence, the driving circuit 19 is supplied by the auxiliary winding 21.

In order to guarantee turning-on of the driving circuit 19, it is expedient for the turn-on transistor 16 to be driven in conduction by the phototransistor 36 (which, in turn, is driven in conduction by the incident light beam generated by the user) for a time sufficient to charge the turn-on capacitor 18. When a voltage $V_C$, sufficient to supply the driving circuit 19, establishes on the turn-on capacitor 18, the driving circuit 19 switches on.

The current that the phototransistor 36 generates, when it is activated by the incident light beam, is not very high. In particular, in the case of use of a turn-on transistor 16 having a gate capacitance of few nF (nanofarads), it is sufficient for the phototransistor 36 to generate a few tens of μA (microampere). In this case, the supply voltage $V_C$ of the driving circuit 19 is reached in a time of the order of a few hundreds of milliseconds, practically negligible for human perception.

The turn-off resistor 34 has the function of draining a possible leakage current of the phototransistor 36, for example caused by undesirable components of a light signal (e.g., natural light) accidentally incident on the phototransistor 36. Moreover, the turn-off resistor 34 favors the switching-off (interdiction state) of the turn-on transistor 16, draining the charge possibly accumulated on the gate terminal G of the turn-on transistor 16 during its operative state. The Zener diode 35 has the function of limiting the potential applied to the gate terminal G of the turn-on transistor 16 to a maximum value represented by the Zener voltage $V_{ZENER}$, proper to the Zener diode 35. In this way, saturation in conduction of the turn-on transistor 16 is prevented.

After the turning-on step, the driving circuit 19 controls in conduction the switching transistor 15. In this way, a current flows through the primary winding 12 of the transformer 11 and supplies, via the auxiliary winding 21, the driving circuit 19 itself. In use, the switching transistor 15 can be controlled via a square-wave modulation (pulse-width modulation—PWM) signal with variable frequency, usually higher than 16 kHz, and enables transfer onto the secondary winding 24 of the supply for operation of the microcontroller 5.

Turning-off of the power supply circuit 30 can be advantageously managed by the microcontroller 5. For example, driving circuits 19 are known provided with a turn-off input 19a. In this case, the microcontroller 5 is connected to said turn-off input 19a for turning-off the driving circuit 19 through a signal Driver_OFF, and consequently turning off the power supply circuit 30. In fact, in the absence of an appropriate light beam incident on the active area of the phototransistor 36, the turn-on transistor 16 is controlled in interdiction, and, after turning-off of the driving circuit 19, also the switching transistor 15 is controlled in interdiction. Consequently, in the absence of supply, the power supply circuit 30 turns off.

As an alternative to the turning-off command by means of the signal Driver_OFF managed by the microcontroller 5, there can be provided an appropriate circuit (not illustrated) for discharging of the turn-on capacitor 18 and for interrupting the supply of the driving circuit 19 managed by the microcontroller 5. Or, yet again, the microcontroller 5 could drive in interdiction the switching transistor 15, interrupting the flow of current through the primary winding 12 of the transformer 11.

The power supply circuit 30 can be supplied by a mains supply, such as domestic power, or by a battery. In the case of battery supply, however, the power supply circuit 30 does not require the rectifier 9.

Finally, a main switch of the electrical appliance in which the power supply circuit 30 is implemented (analogous to the supply switch 8 illustrated in FIG. 2), connected between the supply port 2 and the transformer 11, is not necessary. In fact, in the off state of the power supply circuit 30 (i.e., in the state in which the power supply circuit 30 does not provide electrical supply), the turn-on transistor 16, the switching transistor 15, and the transducer 33 are interdicted and do not conduct any current. The power supply circuit 30 performs itself the function of main switch of the electrical appliance in which it operates.

Figure 4:
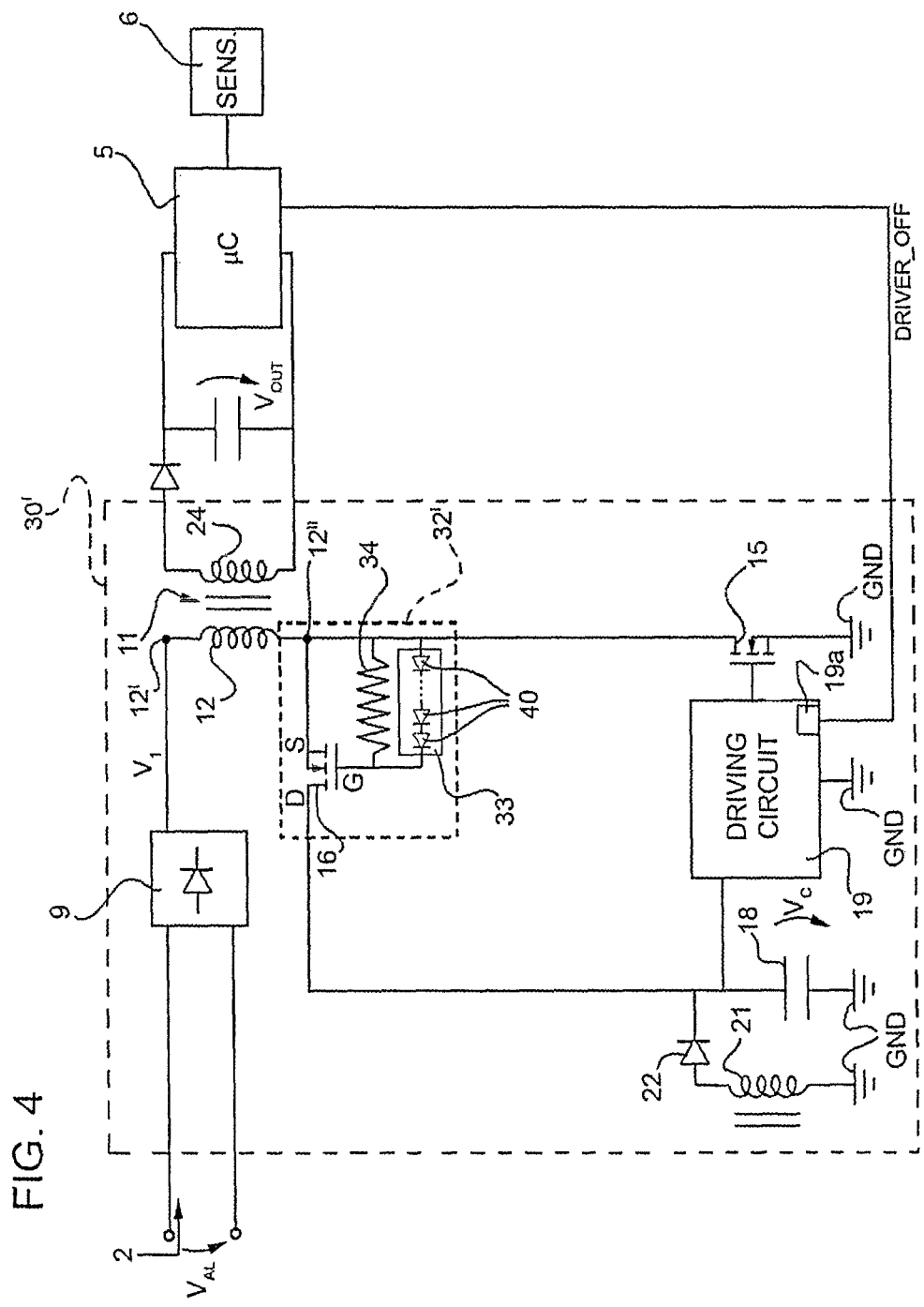
FIG. 4 shows a power supply circuit according to a further embodiment of the present circuit, for managing remote turning-on of an electrical appliance.

FIG. 4 shows a power supply circuit 30' according to a further embodiment of the present disclosure. Elements of the power supply circuit 30' of FIG. 4 analogous to and having substantially the same function of elements described with reference to the power supply circuit 30 of FIG. 3 are not further described herein.

In the embodiment of FIG. 4, the power supply circuit 30' comprises a turn-on circuit 32' that can be activated remotely, as already explained with reference to FIG. 3. The turn-on circuit 32' can be connected indifferently to the first terminal 12' or to the second terminal 12" (FIG. 4 shows the turn-on circuit 32' connected to the second terminal 12") and comprises the turn-on transistor 16, the transducer 33 and the turn-off resistor 34. However, unlike the embodiment of FIG. 3, the second terminal 12" of the primary winding 12 is connected in series to a source terminal S of the turn-on transistor 16. The turn-on transistor 16 is connected, through its own drain terminal D, to the turn-on capacitor 18, which is in turn connected to a ground reference voltage GND. The turn-off resistor 34 is connected in parallel to the transducer 33, i.e. one of its terminal is connected to the gate of the turn-on transistor 16 and the other terminal is connected to the source terminal S of the turn-on transistor 16 (which corresponds, in FIG. 4, to the second terminal 12").

The transducer 33 is remote-controlled and is configured to enable, when activated, passage of a current through it. The transducer 33 is connected between the source terminal S of the turn-on transistor 16 and the gate terminal G of the turn-on transistor 16. The transducer 33 according to the embodiment of FIG. 4 is formed by a plurality of photodiodes connected in series one another. However, a single photodiode may be used, provided that, during activation, it generates across its terminals a voltage sufficiently high to control in conduction the turn-on transistor 16. For example, in case the turn-on transistor 16 is a MOSFET device, the voltage is sufficiently high when the gate terminal G of the MOSFET device 16 is polarized above the MOSFET threshold voltage value for conduction channel formation.

The transducer 33 of FIG. 4 may be activated by means of an incident light beam (generated by a user through a remote control) preferably in the infrared range. As known, a photodiode is configured to generate, when illuminated, current carriers (electrons/holes). In particular, the current carrier generation causes a direct polarization of each photodiode 40, which develops across its terminals a voltage higher than its conduction threshold voltage, for example a voltage of about 600-700 mV. In this way, during use, the current through the photodiodes 40 is almost completely due to the incident light beam, and proportional to the incident light intensity. In absence of incident light beam, each photodiode 40 develops a voltage across its terminals which is lower than its conduction threshold voltage (and current substantially equal to zero).

Figure 5:
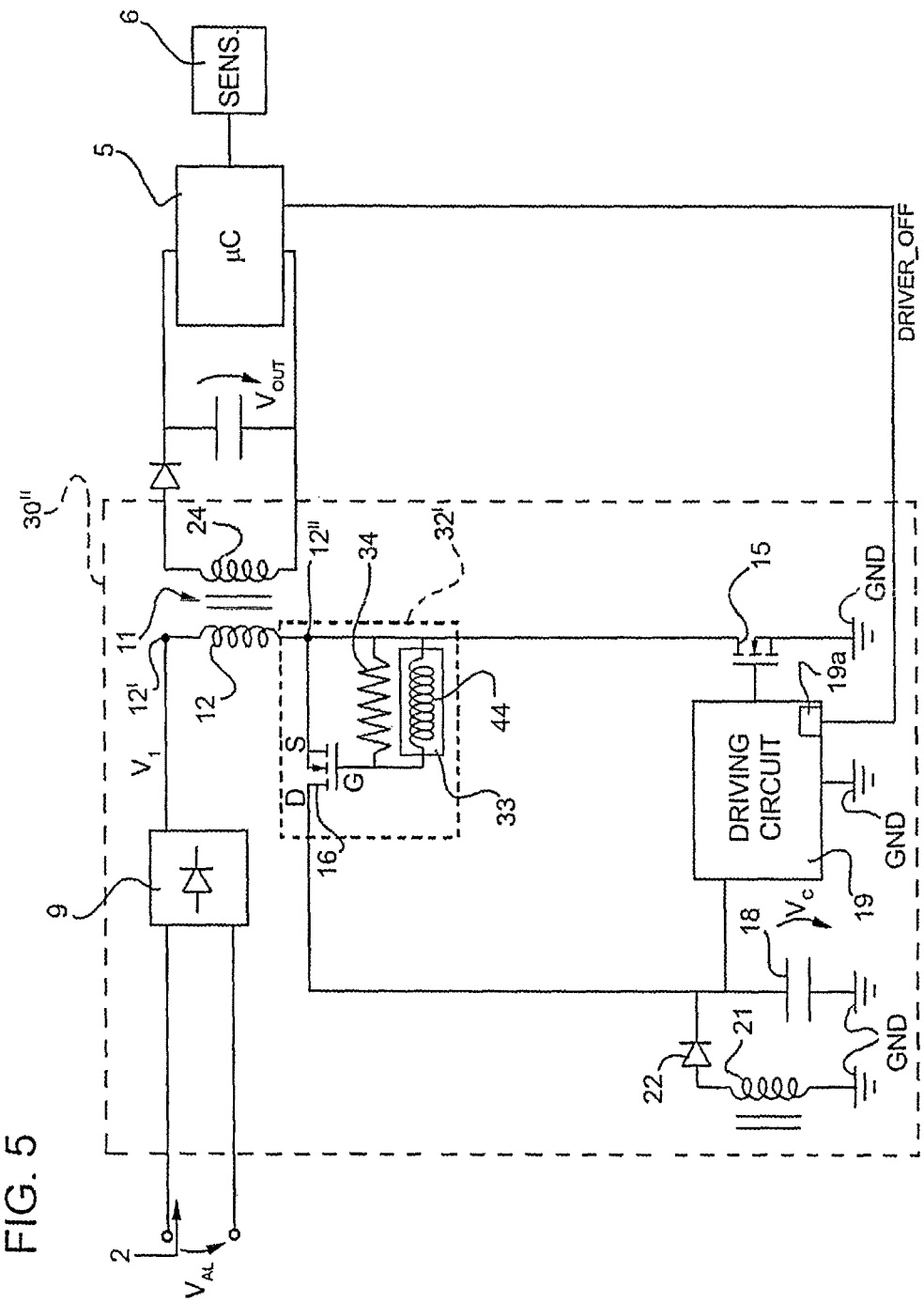
FIG. 5 shows a power supply circuit according to a further embodiment of the present circuit, for managing remote turning-on of an electrical appliance.

FIG. 5 shows a power supply circuit 30" according to a further embodiment of the present disclosure. Elements of the power supply circuit 30" of FIG. 5 analogous to and having substantially the same function of elements described with reference to the power supply circuit 30 of FIG. 3 or power supply circuit 30' of FIG. 4 are not further described herein.

According to the embodiment of FIG. 5, the transducer 33 is connected in the same way as already described with reference to FIG. 4. However, the transducer 33 comprises an antenna 44 (e.g., a patch antenna) connected between the source S and gate G terminals of the turn-on transistor 16. When no activation signal is provided to the antenna 44, the source S and gate G terminals of the turn-on transistor 16 are short-circuited and thus the turn-on transistor 16 is off (i.e., it has an open circuit behavior and no current flows through it). However, when an electromagnetic signal (generated by a user through a remote control) is provided to the antenna 44 so as to induce a current flow through the antenna 44, a voltage develops between the source S and gate G terminals of the turn-on transistor 16. By configuring the antenna 44 (e.g., by providing a sufficient number of turns) so that the voltage developed across the antenna 44 is higher that the conduction threshold voltage of the turn-on transistor 16, for example a voltage of about 600-700 mV, it is possible to control in an on-state the turn-on transistor 16.

The advantage of the embodiments of FIG. 4 and FIG. 5, with respect to the embodiment of FIG. 3, is that high voltage structures are not used.

Figure 6:
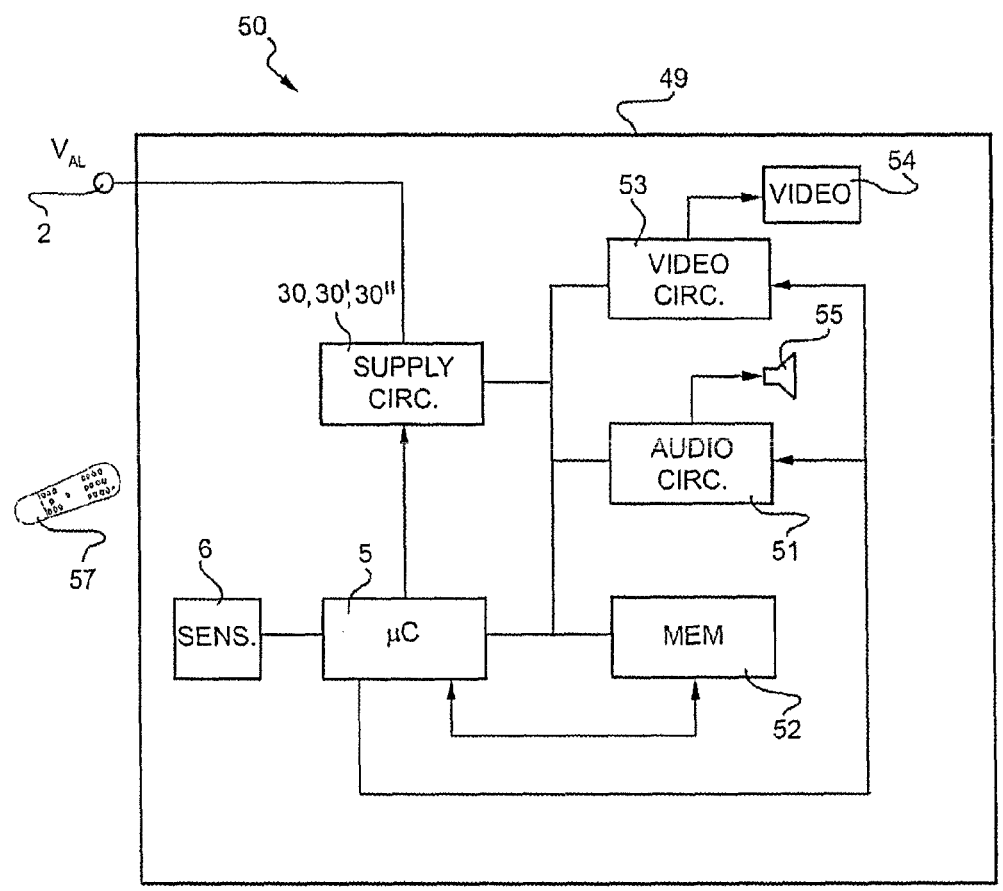
FIG. 6 shows a functional block diagram of an electrical appliance that implements the power supply circuit of any one of FIGS. 3 to 5.

FIG. 6 shows a block diagram of a system 50 comprising an electrical appliance 49 and a remote control 57. By means of the remote control 57, the electrical appliance 49 can be remotely controlled for being turned on and turned off. The electrical appliance 49 may, for example, be an audio/video system such as a television set, a hi-fi system, a video recorder, or an electrical household appliance in general, which implements the power supply circuit 30. In particular, the remote control 57 is configured for issuing a command (i.e., an appropriate wireless signal) for remote activation of the transducer 33 of the power supply circuit 30, in order to manage turning-on of the electrical appliance 49. The remote activation command can be generated by pressing an appropriate key, present on the remote control 57, which governs generation of the appropriate activation wireless signal. Such a wireless signal is, according with the described embodiment, a light beam having a wavelength and a power configured so as to control the phototransistor 36 in generation of an electrical current.

In some electrical devices of a known type, for example in some television sets, two supply circuits are present: a main power supply circuit, which supplies the electrical appliance as a whole during normal use (usually, for safety reasons, obtained with insulated topologies for example of a flyback type, forward type, resonant type, etc.) and an auxiliary power supply circuit, used in the step of turning-on of the electrical appliance and in stand-by mode. Separate implementation of the main power supply circuit and of the auxiliary power supply circuit guarantees a better energy efficiency, but at a higher cost. The turn-on circuit 32 according to an embodiment of the present invention can be implemented indifferently in a main power supply circuit or in an auxiliary power supply circuit. However, by implementing the turn-on circuit 32 according to an embodiment of the present invention in a main power supply circuit a high energy efficiency, a high level of integration of the components, and reduced production costs are guaranteed simultaneously.

The electrical appliance 49 of FIG. 6 is supplied by means of a main power supply circuit 30 connected to the supply port 2, which is, in turn, connected, for example, to the mains supply (e.g., household power line). The electrical appliance 49 comprises: the microcontroller 5, which is connected to the power supply circuit 30 from which it receives the supply, and communicates with the command sensor 6; a sound-reproducing circuit 51, which is connected to the power supply circuit 30 from which it receives the supply, and communicates with the microcontroller 5 and with one or more loudspeakers 55; optionally a memory 52, which is connected to the power supply circuit 30 from which it receives the supply, and communicates with the microcontroller 5, for storing possible programming information of the electronic appliance 49; and, optionally, a video-reproducing circuit 53, which is connected to the power supply circuit 30 from which it receives the supply, and communicates with the microcontroller 5 and is configured for managing display of graphic information or images on a display 54. The sound-reproducing circuit 51, the memory 52, the video-reproducing circuit 53, the display 54, and the loudspeakers 55 can be supplied by means of respective secondary windings (not illustrated) of the transformer 11 of the power supply circuit 30 of FIG. 3.

From an examination of the characteristics of the switch-mode power supply circuit provided according to the present invention the advantages that it makes possible are evident.

In particular, it is possible to eliminate the electric-power consumption of electrical or electronic appliances in stand-by mode, without losing the convenience of turning-on via remote control of the electrical or electronic appliance itself.

Furthermore, the time necessary for turning-on is of the order of a few hundreds of milliseconds, practically negligible for human perception.

Finally, it is clear that modifications and variations may be made to the switch-mode power supply circuit described and illustrated herein, without thereby departing from the sphere of protection of the present invention, as defined in the annexed claims.

For example, in order to limit the sensitivity of a transducer of an optical type (for example, a phototransistor) at a particular wavelength or within a range of wavelengths, it may prove advantageous to set an appropriate filter external to the phototransistor, configured so as to enable passage exclusively of the wavelength/wavelengths of interest.

Furthermore, according to the maximum voltage that the phototransistor sustains (depending upon the supply voltage $V_{AL}$), it may be expedient to connect a plurality of phototransistors 36 in series to one another.

In addition, the turn-on transistor 16 and the switching transistor 15 can be different from a MOSFET transistor; for example, they can be IGBT (insulated-gate bipolar transistor) devices or generic electronic switches.

Finally, the transducer 33 can be of a different type from what has been described. For example, it can be of an electromagnetic type, comprising an antenna and can be remotely activated by means of an electromagnetic signal.

Figure 7:
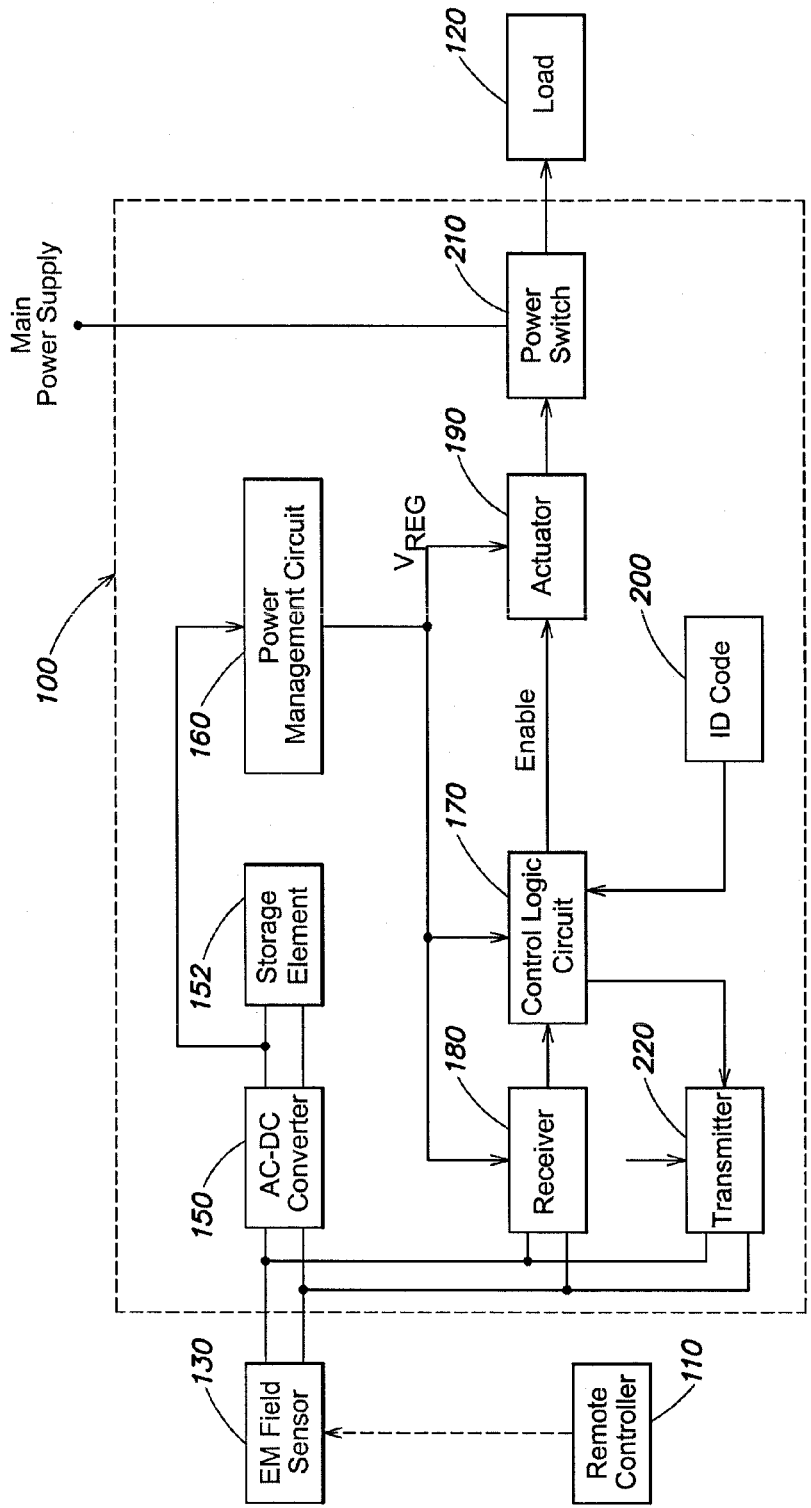
FIG. 7 is a schematic block diagram of a control circuit for controlling electronic equipment in response to a remote controller, in accordance with further embodiments of the invention.

A schematic block diagram of a control circuit, in accordance with embodiments of the invention, for controlling electronic equipment in response to a remote controller is shown in FIG. 7. A control circuit 100 operates in conjunction with a remote controller 110 to control a load 120. The remote controller 110 communicates via wireless communication with control circuit 100. An electromagnetic field sensor 130 may be an antenna or an infrared detector. The load 120 may be any remotely-controlled electronic equipment, such as for example a television, a radio, a DVR, a lamp or a gate, or any other remotely-controlled electrical equipment or appliance. The electronic equipment may include the control circuit 100, the load 120 and the electromagnetic field sensor 130. The control circuit 100 enables the electronic equipment to be turned on by the remote controller 110 with zero standby power drawn by the electronic equipment.

The control circuit 100 includes an AC-DC converter 150 coupled to the sensor 130. The sensor 130 provides an AC signal based on received electromagnetic energy, which may be RF energy or infrared energy. The AC-DC converter 150 converts the AC signal to a DC voltage, typically by rectification of the AC signal, and stores the received electromagnetic energy in a storage element 152, which may be a capacitive element. A voltage representative of the stored energy is supplied to a power management circuit 160. The power management circuit 160 determines when the stored energy is sufficient for operation of the control circuit 100 and generates a regulated supply voltage based on the stored energy. In particular, the power management circuit 160 determines that sufficient energy for operation of control circuit 100 is stored in storage element 152 and generates the regulated supply voltage from the stored energy. The regulated supply voltage is provided to a control logic circuit 170, a receiver 180 and an actuator 190.

In some embodiments, the receiver 180 receives an ID code from the remote controller 110 and supplies the ID code to the control logic circuit 170. The control logic circuit also receives a local ID code 200 which serves as an identifier of the electronic equipment being controlled. The local ID code 200 may be stored in the control circuit 100 of the electronic equipment or received from an external source. The control logic circuit 170 may compare the received ID code and the local ID code and provide an enable signal when a match is detected. The enable signal is supplied by the control logic circuit 170 to actuator 190. The actuator 190, in response to the enable signal, energizes a power switch 210 which causes power from a main power supply to be supplied to the load 120. In some embodiments, the actuator 190 may activate a main power converter of the electronic equipment.

The control circuit 100 may further include a transmitter 220 coupled between the control logic circuit 170 and the sensor 130, in the case where the sensor 130 is an antenna. The transmitter 220 is energized by the regulated supply voltage provided by power management circuit 160. The transmitter 220 may transmit data generated by the control logic circuit 170 to the remote controller 110.

The control circuit 100 operates on the stored energy retained in storage element 152. The stored energy is derived from the electromagnetic radiation supplied to the control circuit 100 by remote controller 110. The regulated supply voltage, in turn, is generated from the stored energy and is used to energize the circuit blocks of the control circuit 100. Thus, the control circuit 100 draws zero power from the main power supply, and no standby power is required to achieve remote turn-on of the electronic equipment.

Figure 8:
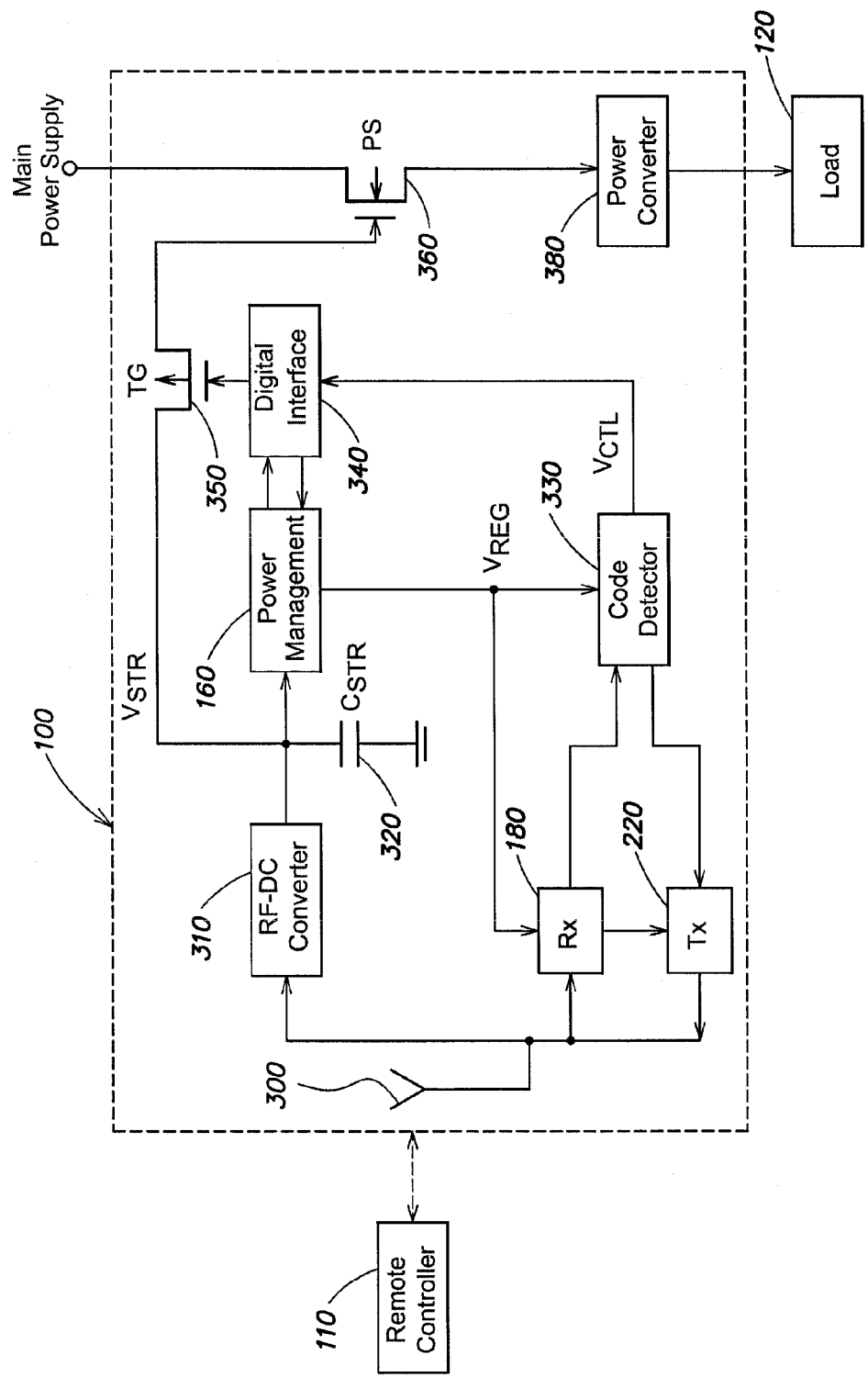
FIG. 8 is a schematic block diagram of a control circuit for controlling electronic equipment in response to a remote controller, in accordance with further embodiments of the invention.

A schematic block diagram of a control circuit, in accordance with further embodiments of the invention, for controlling electronic equipment in response to a remote controller is shown in FIG. 8. Like elements in FIGS. 7 and 8 have the same reference numerals. The control circuit 100 operates with remote controller 110 to control load 120. The control circuit 100 includes an antenna 300 to receive RF energy and data from remote controller 110. An RF-DC converter 310 is coupled to antenna 300 and converts received RF energy to a DC current. The RF-DC converter 310 charges a storage element implemented as a capacitive element 320. Power management circuit 160 operates in response to the charge in capacitive element 320 and provides a regulated supply voltage to the circuit blocks of control circuit 100.

An RF interface includes receiver 180 and optional transmitter 220. Receiver 180 receives data from remote controller 110, and transmitter 220 transmits data to remote controller 110.

A control logic circuit implemented as a code converter 330 is energized by the regulated supply voltage and controls operation based on an identification (ID) code received from the remote controller and a local ID code, as described below. A digital interface 340 is energized by the regulated supply voltage and is activated by an enable signal provided by the code detector 330. The digital interface 340 controls a transfer gate 350, which applies the unregulated voltage of capacitive element 320 to a power switch 360. When the power switch 360 is turned on, the main power supply is applied to a power converter 380, which in turn supplies operating power to the load 120. As indicated above, the load may be the operating circuitry of electronic equipment, such as for example a television or other remotely-controlled electronic equipment.

In operation, the control circuit 100 responds to activation of the remote controller 110 by a user. Upon activation, the remote controller 110 transmits RF energy, including operating power and data, to control circuit 100. RF energy received by the antenna 300 provides an RF signal to RF-DC converter 310. The RF-DC converter 310 in turn converts the RF signal to a DC current which charges capacitive element 320. When the unregulated voltage $V_{STR}$ on capacitive element 320 reaches a first threshold value, the power management circuit 160 provides a regulated supply voltage $V_{REG}$ to the receiver 180 and the code detector 330, so that these blocks are energized for operation.

Data bits which modulate the RF carrier generated by the remote controller 110 are received and decoded by the receiver 180. The received ID code is supplied to code detector 330 and is compared by code detector 330 with an ID code representative of the electronic equipment. The local ID code of the electronic equipment may be stored by code detector 330, may be received from a memory element (not shown) of control circuit 100, or may be received from a source external to control circuit 100.

When a match between the received ID code and the local ID code is detected, the code detector 330 supplies an enable signal $V_{CTL}$ to digital interface 340. The digital interface 340 in turn enables the transfer gate 350 which applies the unregulated voltage $V_{STR}$ from capacitive element 320 to the gate of the power switch 360. The power switch 360 is thereby turned on and the main power supply is applied to the power converter 380. Since the digital interface 340 controls the system at all stages of operation, it is energized by the unregulated voltage $V_{STR}$ from capacitive element 320.

Figure 9:
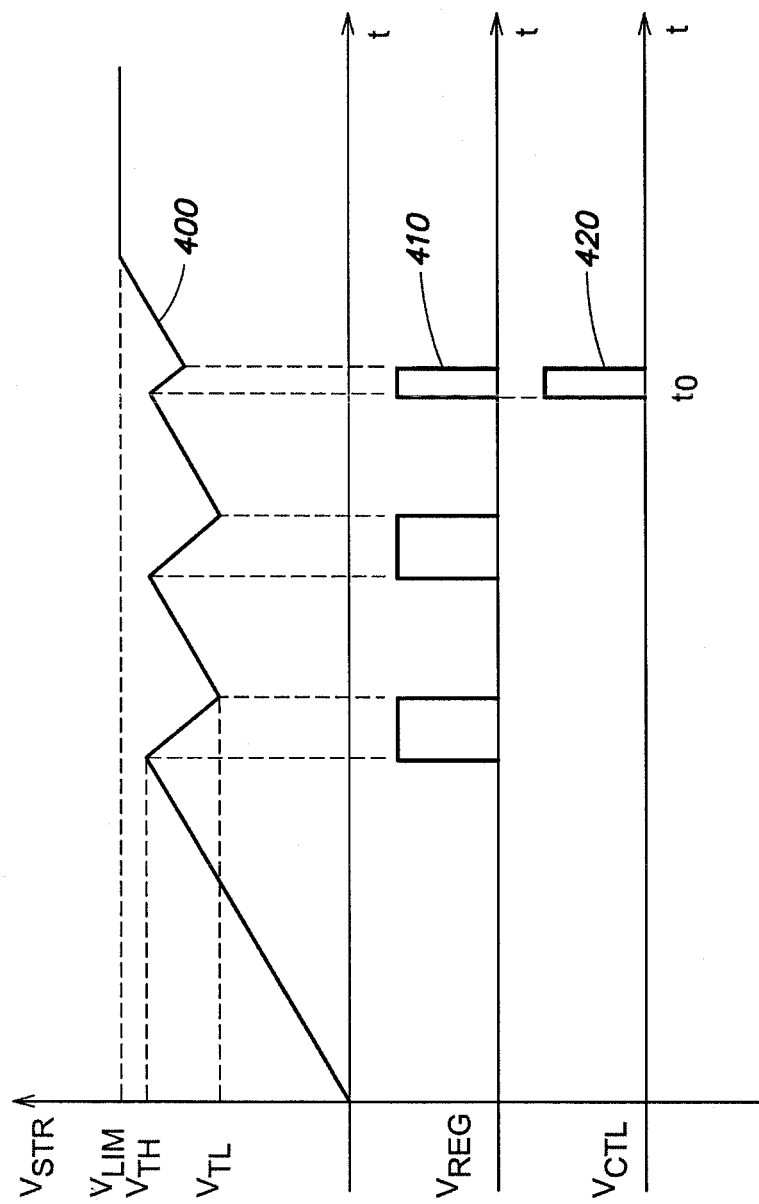
FIG. 9 is a timing diagram that illustrates operation of the control circuit of FIG. 8.

FIG. 9 is a timing diagram that illustrates operation of the control circuit 100 of FIG. 8. Waveform 400 represents the unregulated voltage $V_{STR}$ on capacitive element 320, waveform 410 represents the regulated supply voltage $V_{REG}$ produced by power management circuit 160, and waveform 420 represents the enable signal $V_{CTL}$ provided by code detector 330. When the remote controller 110 is activated by a user, RF energy is transmitted by remote controller 110 and received by antenna 300. The received RF energy is converted to a DC current by RF-DC converter 310, and the DC current charges capacitive element 320, as indicated by waveform 400 in FIG. 9.

The rate of increase of the unregulated voltage $V_{STR}$ depends on the power level transmitted by the remote controller 110 and the distance between the remote controller 110 and the antenna 300. While the capacitive element 320 charges more slowly for longer distances, the control circuit 100 nonetheless operates at such longer distances. When the voltage $V_{STR}$ on capacitive element 320 reaches a first upper threshold value $V_{TH}$, the power management circuit 160 generates the regulated voltage $V_{REG}$, as indicated by waveform 410. The first upper threshold value $V_{TH}$ is a voltage considered sufficient for operation of the circuit blocks of control circuit 100. The voltage on capacitive element 320 may then decrease as current is drawn by the circuit blocks of the control circuit 100. When the unregulated voltage $V_{STR}$ drops to a second lower threshold value $V_{TL}$, considered insufficient for operation of the control circuit 100, the regulated supply voltage $V_{REG}$ is turned off, as indicated by waveform 410. The circuitry may thus operate continuously or intermittently according to the amount of energy received from the remote controller 110 and the amount of current drawn from capacitive element 320. It may be observed that RF energy received from sources other than remote controller 110 also cause charging of capacitive element 320. Such incidental charging of capacitive element 320 is considered beneficial to operation.

During the periods when the regulated supply voltage $V_{REG}$ is supplied to receiver 180 and code detector 330, as indicated by waveform 410, the code detector 330 compares a received ID code with the local ID code of the electrical equipment. The received ID code is provided from the remote controller 110 to the control circuit 100 by modulation of the RF energy transmitted by the remote controller 110. If a match between the received ID code and the local ID code is detected, the code detector 330 provides an enable signal $V_{CTL}$ at time $t_0$, as indicated by waveform 420 in FIG. 9. The enable signal $V_{CTL}$ is provided to the digital interface 340 which turns on the transfer gate 350. Transfer gate 350 then turns on power switch 360. The digital interface 340 also turns off the receiver 180 and the power management circuit 160, so that the voltage across the capacitive element 320 increases to a limiting voltage $V_{LIM}$, as indicated by waveform 400 in FIG. 9.

Figure 10:
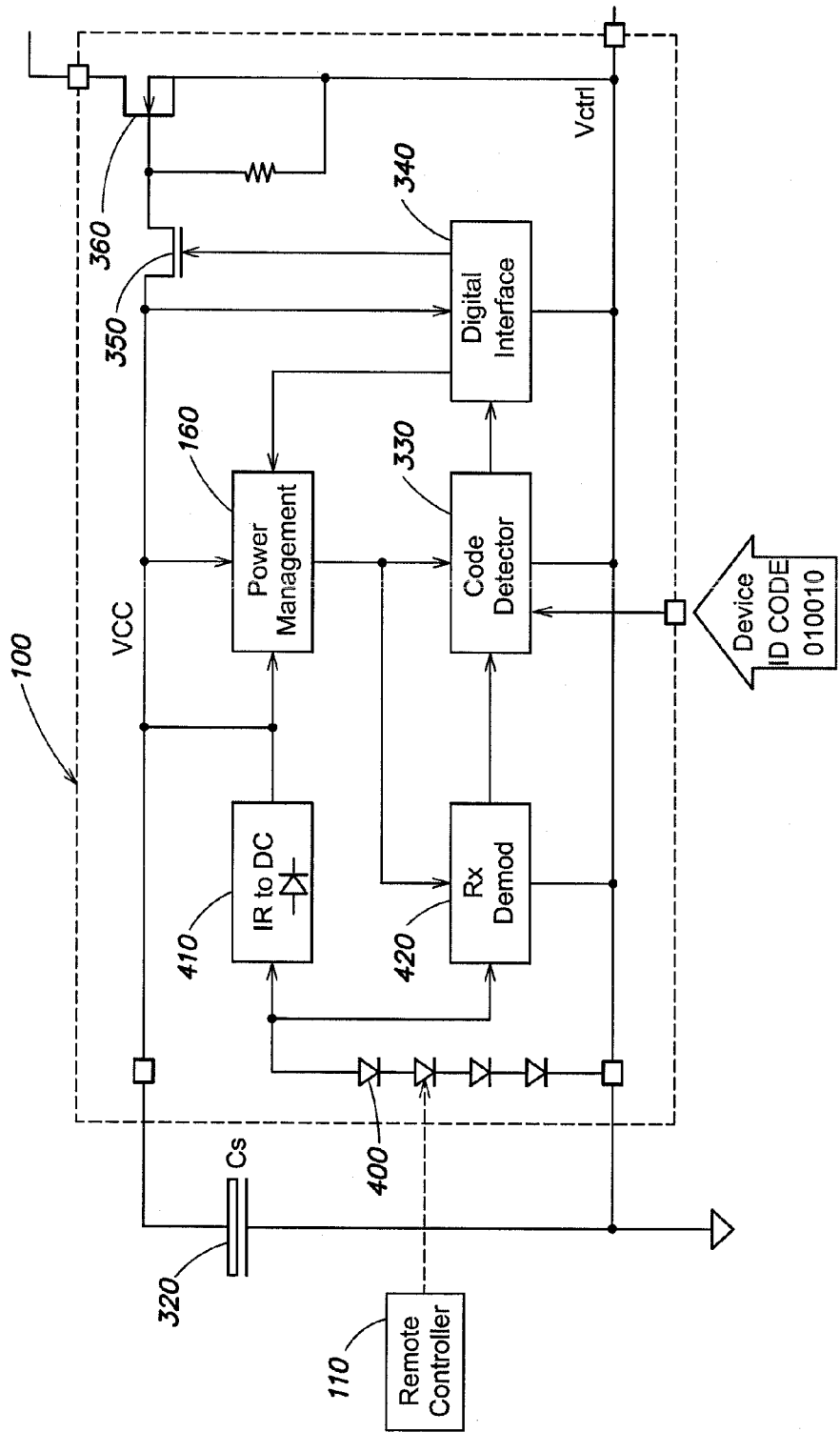
FIG. 10 is a schematic block diagram of a control circuit for controlling electronic equipment in response to a remote controller, in accordance with further embodiments of the invention.

A schematic block diagram of a control circuit, in accordance with further embodiments of the invention, for controlling electronic equipment in response to a remote controller is shown in FIG. 10. Like elements in FIGS. 7, 8 and 10 have the same reference numerals. The embodiment of FIG. 10 differs from the embodiment of FIG. 8 primarily in that the remote controller 110 transmits infrared energy rather than RF energy. As in the embodiments of FIGS. 7 and 8, the control circuit 100 enables the electronic equipment to be turned on by the remote controller 110 with zero standby power drawn by the electronic equipment.

As shown in FIG. 10, the control circuit 100 includes an infrared detector 400 coupled to an IR-DC converter 410 and to a receiver/demodulator 420. The infrared detector 400 may be any suitable device capable of detecting infrared energy. The IR-DC converter 410 converts the received infrared energy to a DC current which charges capacitive element 320. The receiver/demodulator 420 decodes data bits which modulate the infrared energy and provides the data bits to code detector 330. The control circuit 100 of FIG. 10 does not include a transmitter. The power management circuit 160, the code detector 330, the digital interface 340, the transfer gate 350 and the power switch 360 operate as described above in connection with FIGS. 8 and 9.

FIG. 8 illustrates an embodiment wherein the remote controller 110 transmits operating power and data to control circuit 100 using RF energy. FIG. 10 illustrates an embodiment where remote controller 110 transmits operating power and data to control circuit 100 by infrared energy. It will be understood that operating power can be transmitted by RF energy and that data can be transmitted separately by infrared energy, or vice-versa. In such embodiments, the control circuit 100 is equipped with both an antenna and an infrared detector. Such embodiments require additional circuitry, but may be advantageous in some situations.

In the embodiments of FIGS. 7, 8 and 10, it has been assumed that the main power supply is an AC power supply. However, the embodiments of FIGS. 7, 8 and 10 are not so limited, and may be utilized with electronic equipment that is energized by DC power, including battery power.

The control logic circuit 170 is described above as generating an enable signal in response to detecting a match between a received ID code and a local ID code. In other embodiments, the enable signal may be provided in response to another condition being met. For example, the enable signal may be provided in response to a different code and/or the status of the regulated supply voltage.

Having thus described at least one illustrative embodiment of the invention, various alterations, modifications, and improvements will readily occur to those skilled in the art. Such alterations, modifications, and improvements are intended to be within the spirit and scope of the invention.

Accordingly, the foregoing description is by way of example only and is not intended as limiting. The invention is limited only as defined in the following claims and the equivalents thereto.

What is claimed is:

1. A control circuit configured to control electronic equipment in response to a remote controller, comprising:
a converter circuit configured to convert electromagnetic energy received from the remote controller to stored energy;
a power management circuit configured to provide a regulated supply voltage based on the stored energy;
a control logic circuit energized by the regulated supply voltage and configured to to detect a match between an ID code received from the remote controller and a local ID code representative of the electronic equipment, and to provide an enable signal in response to detecting the match; and
an actuator circuit configured to activate the electronic equipment in response to the enable signal.

2. A control circuit as defined in claim 1, wherein the converter circuit is configured to convert radio frequency energy to the stored energy.

3. A control circuit as defined in claim 1, wherein the converter circuit is configured to convert infrared energy to the stored energy.

4. A control circuit as defined in claim 1, further comprising a receiver configured to receive the ID code from the remote controller.

5. A control circuit as defined in claim 1, wherein the actuator circuit is configured to activate a main power converter of the electronic equipment.

6. A control circuit as defined in claim 4, wherein the receiver is configured to receive, after the electronic equipment is activated by the actuator circuit, a command to control the electronic equipment.

7. A control circuit as defined in claim 1, wherein the power management circuit is configured to turn on the regulated supply voltage in response to a voltage representative of the stored energy reaching a first threshold value.

8. A control circuit as defined in claim 7, wherein the power management circuit is configured to turn off the regulated supply voltage in response to the voltage representative of the stored energy dropping to a second threshold value.

9. A control circuit as defined in claim 1, further comprising a storage element configured to retain the stored energy.

10. A control circuit as defined in claim 9, wherein the storage element comprises a capacitive element.

11. A control circuit as defined in claim 1, further comprising a transmitter energized by the regulated supply voltage and configured to transmit data to the remote controller.

12. A method for remotely controlling electronic equipment, comprising:
converting, by a converter circuit, electromagnetic energy received from a remote controller to stored energy;
providing, by a power management circuit, a regulated supply voltage based on the stored energy;
energizing a control logic circuit with the regulated supply voltage;
detecting, by the control logic circuit, a match between an ID code received from the remote controller and a local ID code representative of the electronic equipment, and providing an enable signal in response to detecting the match; and
activating the electronic equipment in response to the enable signal.

13. A method as defined in claim 12, wherein converting electromagnetic energy comprises converting radio frequency energy.

14. A method as defined in claim 12, wherein converting electromagnetic energy comprises converting infrared energy.

15. A method as defined in claim 12, further comprising receiving, by a receiver, the ID code from the remote controller and providing the received ID code to the control logic circuit.

16. A method as defined in claim 12, wherein activating the electronic equipment comprises activating a main power converter of the electronic equipment.

17. A method as defined in claim 15, further comprising receiving, after the electronic equipment is activated, a command adapted to control the electronic equipment.

18. A method as defined in claim 12, wherein providing the regulated supply voltage comprises turning on the regulated supply voltage in response to a voltage representative of the stored energy reaching a first threshold value.

19. A method as defined in claim 18, wherein providing the regulated supply voltage comprises turning off the regulated supply voltage in response to the voltage representative of the stored energy dropping to a second threshold value.

20. A method as defined in claim 12, further comprising retaining the stored energy in a storage element.

21. A method as defined in claim 12, further comprising retaining the stored energy in a capacitive element.

22. A method as defined in claim 12, further comprising transmitting data to the remote controller.

23. A control circuit configured to control electronic equipment in response to a remote controller, comprising:
a converter circuit configured to convert electromagnetic energy received from the remote controller to stored energy;
a power management circuit configured to turn on a regulated supply voltage in response to a voltage representative of the stored energy reaching a first threshold value;
a control logic circuit energized by the regulated supply voltage and configured to provide an enable signal in response to a condition being met; and
an actuator circuit configured to activate the electronic equipment in response to the enable signal.

24. A control circuit as defined in claim 23, wherein the control logic circuit is configured to detect a match between an ID code received from the remote controller and a local ID code representative of the electronic equipment, and to provide the enable signal in response to detecting the match.

25. A control circuit as defined in claim 23, wherein the power management circuit is configured to turn off the regulated supply voltage in response to the voltage representative of the stored energy dropping to a second threshold value.

* * * * *

UNITED STATES PATENT AND TRADEMARK OFFICE
CERTIFICATE OF CORRECTION

PATENT NO. : 9,118,250 B2  
APPLICATION NO. : 13/832687  
DATED : August 25, 2015  
INVENTOR(S) : Natale Aiello et al.

Page 1 of 1

It is certified that error appears in the above-identified patent and that said Letters Patent is hereby corrected as shown below:

Title Page, Item 30  Insert --Foreign Application Priority Data  
Mar. 20, 2009  (IT)....................TO2009A000214--

In The Claims

Column 13, Line 14,  Delete: "to to"  
Claim 1  Insert --to--

Signed and Sealed this  
Twenty-second Day of December, 2015

Michelle K. Lee  
*Director of the United States Patent and Trademark Office*